United States Patent
Hennings et al.

(10) Patent No.: US 8,812,182 B2
(45) Date of Patent: Aug. 19, 2014

(54) CONTROL SYSTEM FOR A VEHICLE HAVING TWO AXLE DRIVE DEVICES AND METHOD FOR OPERATING A CONTROL SYSTEM

(75) Inventors: Stephan Hennings, Leonberg (DE); Stefan Unger, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 735 days.

(21) Appl. No.: 13/012,872

(22) Filed: Jan. 25, 2011

(65) Prior Publication Data

US 2011/0196555 A1   Aug. 11, 2011

(30) Foreign Application Priority Data

Feb. 5, 2010   (DE) .......................... 10 2010 007 644

(51) Int. Cl.
- *G05D 1/00* (2006.01)
- *B60L 11/06* (2006.01)
- *B60K 17/356* (2006.01)

(52) U.S. Cl.
USPC ............. 701/22; 701/89; 180/65.25; 180/242

(58) Field of Classification Search
USPC ......................... 701/82, 89, 22, 36, 37; 703/8; 180/65.21, 65.25, 65.265, 242
See application file for complete search history.

(56) References Cited

U.S. PATENT DOCUMENTS

| | | | | |
|---|---|---|---|---|
| 5,832,400 A | * | 11/1998 | Takahashi et al. | 701/53 |
| 5,995,895 A | * | 11/1999 | Watt et al. | 701/50 |
| 6,092,014 A | * | 7/2000 | Okada | 701/70 |
| 6,205,379 B1 | * | 3/2001 | Morisawa et al. | 701/22 |
| 6,356,839 B1 | * | 3/2002 | Monde et al. | 701/415 |
| 7,389,170 B2 | * | 6/2008 | Nakao | 701/80 |
| 2003/0000500 A1 | * | 1/2003 | Chatfield | 123/438 |
| 2003/0034188 A1 | * | 2/2003 | Gotou | 180/65.2 |
| 2008/0300779 A1 | * | 12/2008 | Uhlmann et al. | 701/200 |
| 2011/0017534 A1 | * | 1/2011 | Kaltenbach et al. | 180/65.25 |

FOREIGN PATENT DOCUMENTS

| | | | | |
|---|---|---|---|---|
| DE | 198 31 487 | | 3/2000 | |
| DE | 199 41 879 | | 8/2006 | |
| DE | 10 2007 016 420 | | 10/2008 | |
| DE | WO2009/021913 A2 | * | 2/2009 | ............... B60K 6/48 |

* cited by examiner

*Primary Examiner* — Christine Behncke
(74) *Attorney, Agent, or Firm* — Gerald E. Hespos; Michael J. Porco; Matthew T. Hespos

(57) ABSTRACT

A control system (1) for a vehicle (10) with two axle drive devices (5, 12) has an engine control device (28) for controlling a first axle drive device (5) for driving a first axle of the vehicle (10) by a connected combustion engine (14) in a two-wheel drive mode and by a four-wheel drive mode. The control system (1) also has a control device (26) for controlling a second electric axle drive device (12) for driving a second axle of the vehicle in a four-wheel drive mode. The control device (26) is connected to the engine control device (28) for passing on at least one characteristic diagram to the engine control device (28).

5 Claims, 7 Drawing Sheets

CONTROL SYSTEM FOR A VEHICLE HAVING TWO AXLE DRIVE DEVICES AND METHOD FOR OPERATING A CONTROL SYSTEM

CROSS-REFERENCE TO RELATED APPLICATION

This application claims priority under 35 USC 119 to German Patent Application No. 10 2010 007 644.9, filed on Feb. 5, 2010, the entire disclosure of which is incorporated herein by reference.

BACKGROUND OF THE INVENTION

1. Field of the Invention

The invention relates to a control system for a vehicle, for example a motor vehicle, wherein the control system has an engine control device for controlling a drive of a first vehicle axle by means of an internal combustion engine, and a control device for controlling a second drive of a second vehicle axle. Furthermore, the invention relates to a method for operating a control system, and to a vehicle having such a control system.

2. Description of the Related Art

Vehicles that are equipped either with a two-wheel drive mode or a four-wheel drive mode to drive one or both axles of the vehicle are known from the prior art. In this context, an internal combustion engine drives an axle in the two-wheel drive mode or drives two axles the four-wheel drive mode. A driver of a racing vehicle can manually request a characteristic diagram by pressing, for example, a corresponding switch. The vehicle that has a two-wheel drive mode or a four-wheel drive mode then is controlled by an assigned controller in the vehicle on the basis of the characteristic diagram.

The object of the invention is to make available an improved drive controller for a vehicle.

SUMMARY OF THE INVENTION

The invention relates to a control system for a vehicle having two axle drive devices. More particularly, the control system has an engine control device for controlling a first axle drive device for a driving a first axle of the vehicle by means of a connected combustion engine in a two-wheel drive mode and by means of a four-wheel drive mode. The control system also has a control device for controlling a second electric axle drive device for driving a second axle of the vehicle in a four-wheel drive mode. The control device is connected to the engine control device for passing on a characteristic diagram to the engine control device.

The control system has the advantage that a characteristic diagram can be called automatically, for example by the control device, and passed on directly to the engine control device. As a result, the engine control device can suitably actuate the first axle drive device on the basis of the characteristic diagram to implement an optimum four-wheel drive mode.

The invention also relates to a method for operating a control system of a vehicle. The control system has an engine control device for controlling a first axle drive device by a connected combustion engine, and a control device for controlling a second electric axle drive device. The method includes storing at least one characteristic diagram for controlling the first axle drive device by the engine control device. The method continues by having the control device call the characteristic diagram when the control device actuates the second axle drive device to drive the assigned second vehicle axle. The method proceeds by passing on of the characteristic diagram to the engine control device for controlling the first axle drive device on the basis of the characteristic diagram to drive the assigned first vehicle axle.

The method advantageously enables a characteristic diagram for the engine control device to be called automatically by the control device and passed on to the control device, for example, to switch from a two-wheel drive mode, in which only the first vehicle axle is driven, to a four-wheel drive mode, in which both vehicle axles are driven, thereby permitting an optimum four-wheel drive mode to be implemented. In this context it also is possible to dispense with the manual requesting of a characteristic diagram by the driver, since this already is carried out automatically by the control device.

The particular advantage of the inventive control system or method for requesting characteristic diagrams, in particular of a lambda control method, is the lowering of the fuel consumption of the combustion engine while only slightly reducing the performance. In particular, racing vehicles used in long-distance racing are given a better performance through a reduction in the number of pit stops that are required.

The invention will be described in more detail below with reference to the exemplary embodiments specified in the schematic figures of the drawings.

DETAILED DESCRIPTION OF THE PREFERRED EMBODIMENT

Identical and functionally identical elements and devices have been represented with the same reference symbols in all the figures unless otherwise stated.

FIGS. 1 to 6 illustrate an axle hybrid with a conventional combustion engine (e.g. an internal combustion engine) arranged, for example, in the rear of the vehicle to drive the two wheels of the rear axle. The two wheels of the front axle, in contrast, are provided on an electric axle and/or have an electric axle drive device as described in detail below. The electric axle drive device comprises, for example, two electric machine devices that are separated from one another and that drive the respective assigned wheel by a respective spur gear stage and a cardan shaft. An energy storage device, such as a high-voltage battery device or a flywheel energy store, is provided to supply electrical energy.

The invention makes available improved data exchange between a control device or a hybrid control device and an engine control device.

The design and method of functioning of a coupled axle drive system with a conventional axle drive device and a second electric axle drive device is described with reference to the figures. The control system of the invention has the engine control device and the control device to control the first and second axle drive devices. The first conventional axle drive device is activated by the engine control device, and the second electric axle drive device is activated by the control device or the hybrid control device.

Figure 1:
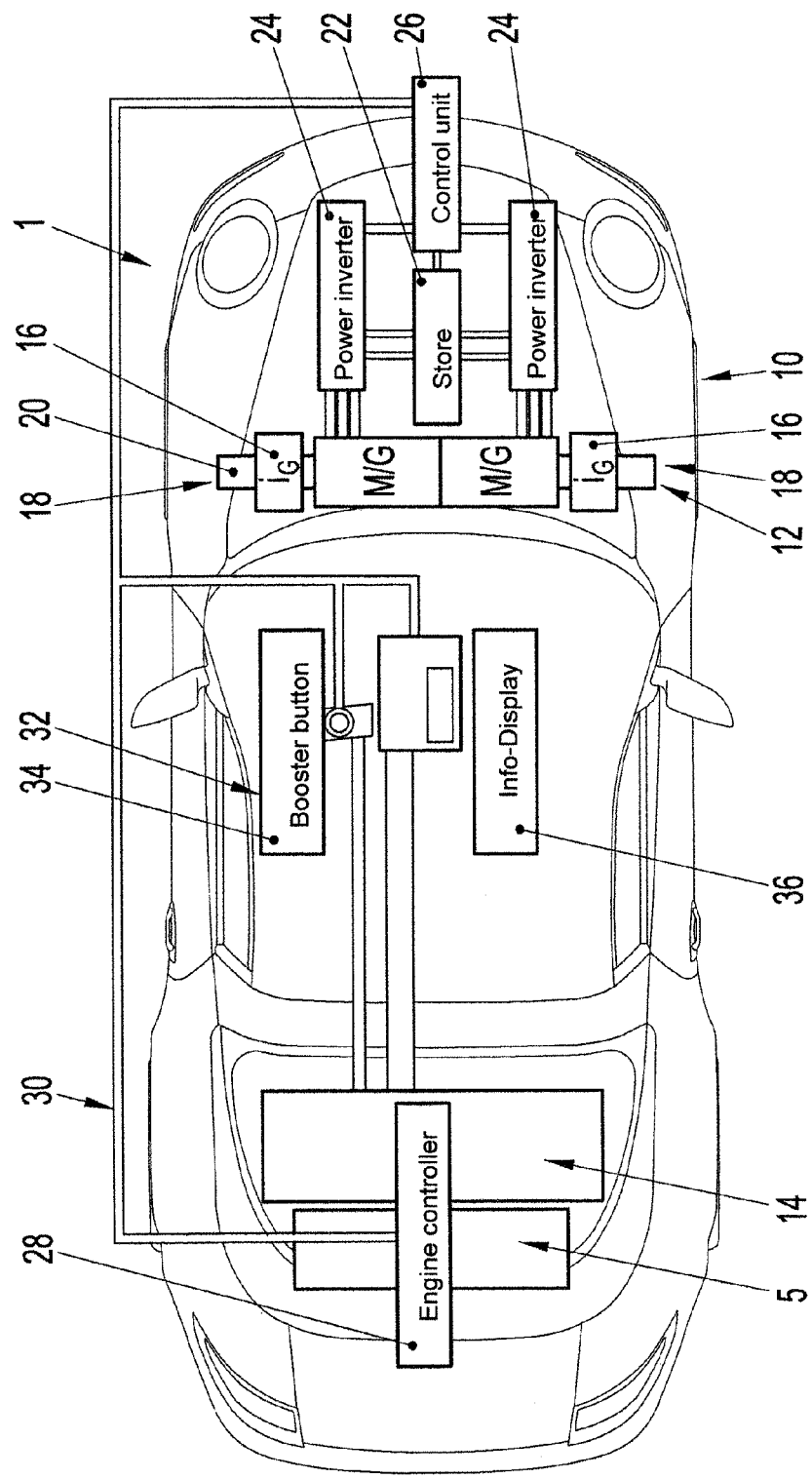
FIG. 1 is a plan view of a vehicle with a schematic illustration of the coupled axle drive system according to one embodiment of the invention.

FIG. 1 is a plan view of a vehicle 10 with a coupled axle drive system and the control system of the invention. The coupled axle drive system is illustrated in a purely schematic and highly simplified form. The method of the invention for requesting characteristic diagrams, in particular a lambda control method, can be applied in various coupled axle drive systems, for example even if the first axle drive device and the second electric axle drive device form a common drive train.

The vehicle 10 has a combustion engine 14, such as an internal combustion engine, as shown in FIG. 1. The combustion engine 14 is illustrated in FIG. 1 as being in the rear part of the vehicle 10 and drives the two wheels (not illustrated) of the rear axle by means of a first conventional axle drive device 5. To be more precise, the vehicle 10 has a two-wheel drive mode implemented by the first axle drive device. However, the vehicle 10 also can be switched to a four-wheel drive mode or all-wheel drive mode.

The coupled axle drive system has a second electric axle drive device 12 that drives at least one wheel of an axle or, as is shown in the present example, drives both wheels of the front axle 20 of the vehicle 10. For this purpose, the electric axle drive device 12 has, for example, two electric machines 16 that respectively drive assigned wheels 18 of the front axle 20. The illustrated electric machines 16 are of independent design and separated from one another for driving the two wheels 18 independently of one another. However, just one electric machine 16 could be provided to drive both wheels 18 of the axle 20 (not illustrated).

As is shown in the example in FIG. 1, the electric axle 20 with the electric axle drive device 12 comprises two electric machines 16 (e.g. electric motors) that are separated from one another and that drive the assigned wheel 18 by, for example, a respective spur gear stage and a cardan shaft. An energy storage device 22, such as a battery, a high-voltage battery, or a flywheel energy storage device, is provided for supplying the electric machines 16 with energy. However, the invention is not limited to the battery or the flywheel storage device, and another type of energy storage device 22 or a combination of energy storage devices 22 can be provided to supply the electric machine device 16 appropriately with the necessary energy.

The energy storage device 22 is connected to a power inverter 24 or a transformer. The power inverter 24 converts the direct current of the energy storage device 22 into an alternating current for the respective electric machine 16 so that the electric machine 16 can drive the assigned wheel 18 of the electric axle 20 when necessary. The two wheels 18 are driven by a corresponding control device 26 or hybrid control device of the control system 1. The control device 26 is connected to the energy storage device 22, the two power inverters 24 and the two electric machines 16. The control device 26 is coupled to an engine control device 28 of the control system of the invention, as is shown in FIG. 1, or is connected by a bus system 30, such as a CAN bus system. In this context, the combustion engine 14 and the first axle drive device 5 are controlled to activate the assigned rear axle by the engine control device 28 of the control system.

The invention provides improved data exchange between the control unit of the electric axle, i.e. the control device or hybrid control device, and the control unit of the internal combustion engine, i.e. the engine control device.

Racing vehicles have an input device, such as a switch, to enable a driver to request a characteristic diagram manually. This input device may be used to call a suitable characteristic diagram in situations where the driver requires a higher power level or a lower power level. Characteristic diagrams for various lambda values may be defined for the driver. For example, the driver can select a characteristic diagram for a relatively low lambda value if the driver requires a higher power level. A rich mixture assigned to that lambda value then is made available for the connected combustion engine by means of the engine control device. The combustion engine is the first conventional axle drive device and in this example drives the rear axle and the wheels connected thereto.

The control system of the invention provides an automatic means for requesting a characteristic diagram instead of or in addition to the previously described manual requesting of a characteristic diagram.

For this purpose, the travel of the vehicle on the basis of the two-wheel drive mode and on the basis of the four-wheel drive mode can be simulated in advance. More particularly, travel on a previously known racetrack is simulated once in the two-wheel drive mode, in which the first conventional axle drive device simulates the rear axle, and once in the four-wheel drive mode, in which the front axle also is driven by means of the second electric axle drive device. The route sections of the racetrack in which a four-wheel drive mode is favorable then can be determined from the comparison of the simulations. Route sections through which the vehicle travels more quickly in the simulation with the four-wheel drive mode than with the two-wheel drive mode are determined.

During later actual travel through the racetrack with the vehicle, the four-wheel drive mode is switched on in route sections previously determined to be particularly suited for the four-wheel drive mode. Thus, the rear axle is driven conventionally in these route sections by the first axle drive device or the connected combustion engine, and the front axle also is driven by the second electric axle drive device.

The second electric axle drive device is actuated here by the control device 26 of the control system 1. The control device 26 of the invention then requests a suitable characteristic diagram for driving the first axle by the first axle drive device in the four-wheel drive mode, which characteristic diagram is stored in advance in a memory device that can be part of the control device 26 or a separate part connected or coupled to the control device 26. The characteristic diagram is predefined, for example, as a function of a corresponding lambda value, and according to the invention, is passed on from the control device directly to the engine control device. The engine control device then controls the combustion engine or the first conventional axle drive device on the basis of the characteristic diagram. Hence, the engine control device can set the suitable lambda value by means of the characteristic diagram or can make available to the combustion engine a fuel mixture assigned to the lambda value so that the combustion engine or the first axle drive device correspondingly drives the rear axle of the vehicle, and therefore, for example, an optimum four-wheel drive mode can be implemented for the assigned route section. This has the advantage that, in the course of a race, the driver does not have to input manually, for example, a suitable lambda value by reference to which the engine control device then sets a corresponding fuel mixture for the combustion engine. Instead, the lambda value is called automatically by the control device for the electric axle drive device and passed on directly to the engine control device of the control system 1.

The requesting of a characteristic diagram is therefore performed automatically by the control device 26 of the control system 1. This can be implemented, in particular, for the situation in which the control device 26 operates the electric machine devices 16 of the electric axle or second electric axle drive device 12 as a generator (regeneration). For this purpose, a means of requesting characteristic diagrams in accordance with raising of the load point of the internal combustion engine 14 (a lambda control means) can be provided. Simple regeneration during travel with the accelerator pedal in approximately the same position is therefore possible by virtue of the fact that automated requesting of another characteristic diagram by the control device 26 or the hybrid control device and the automatic passing on of the characteristic diagram to the engine control device 28 causes the load point of the internal combustion engine 14 to be raised. Of course, requesting of the characteristic diagram independently of regeneration is also possible by means of the control device 26 of the control system 1.

Furthermore, the control device 26 and/or the engine control device 28 of the control system 1 can optionally additionally be connected, as shown in FIG. 1, to at least one manual input device 32, for example a booster knob 34, and/or to a display device 36. In this context, the driver of the vehicle 10 can input by means of the input device 32 that he would like to operate the vehicle 10 in a predetermined operating mode. In this context, for example an operating mode which is suitable for a four-wheel drive mode, with at least one associated characteristic diagram which can be set manually by the driver by means of the booster knob, can be predefined as such an operating mode.

Such an operating mode is, for example, an acceleration mode in which the driver can, for example, accelerate his vehicle 10 out of a bend. If the driver selects the acceleration mode by means of the input device 32, this means that the vehicle 10 in this acceleration mode is driven by means of a four-wheel drive mode by means of both axles, instead of by means of a two-wheel drive mode by means of the rear axle. In this operating mode, the control device 26 or hybrid control device switches on the second electric drive device 12. In the four-wheel drive mode, the second axle, here for example the front axle 20, can be additionally driven by means of the electric drive device 12, with the result that a four-wheel drive mode is implemented. For this purpose, as previously described, the front axle 20 and the two front wheels 18 are additionally driven by means of the electric drive device 12 and the two electric machine devices 16 thereof.

A further example of an operating mode which is suitable for a four-wheel drive mode is an up-hill mode in which, for example, the driver wishes to travel with his vehicle 10 up or down or a hill with a corresponding gradient. In this case, by means of the up-hill mode the vehicle 10 can be operated in the four-wheel drive mode instead of in the two-wheel drive mode. For this purpose, the control device 26 or the hybrid control device switches on the second electric drive device. However, the acceleration mode and the up-hill mode are merely two examples of a multiplicity of operating modes in which it is particularly favorable for the vehicle 10 to be driven by means of a four-wheel drive mode. Instead of the specified operating modes, it is possible to provide a multiplicity of operating modes which are suitable for operating the vehicle as a four-wheel drive vehicle. In this context, the individual operating modes are assigned one or more characteristic diagrams, for example a characteristic diagram with a corresponding lambda value which can be automatically passed on from the control device 26 to the engine control device 28 of the control system 1 to control the first conventional axle drive device 5 or the combustion engine 1 correspondingly.

In the display device 36 it is additionally possible either to display, for example, the selected operating mode and/or a selection of suitable operating modes from which the driver can select. The display device 36 also can be an input device (not illustrated) and can have a touchscreen for inputting or clicking on a desired operating mode in which the vehicle 10 is operated in a four-wheel drive mode.

If, as previously described, an operating mode is input manually by the driver, in order to operate the vehicle in a four-wheel drive mode, the control device 26 of the control system can automatically pass on the at least one characteristic diagram assigned to the operating mode to the engine control device 28 in order to actuate the first axle drive device 5. For example, the control device 26 can call a corresponding characteristic diagram with an assigned lambda value for this operating mode and pass it on to the engine control device 28, with the result that said engine control device 28 can provide the combustion engine 1 with a fuel mixture which is assigned to the lambda value, for example a rich or lean mixture, for the purpose of driving the first axle drive device 5. The invention is, however, not restricted here to characteristic diagrams with assigned lambda values. These characteristic diagrams are merely an example.

Since a characteristic diagram is called automatically for the engine control device by the control device 26 and passed on to the engine control device 28, improved data exchange can be brought about between these two devices of the control system 1. Furthermore, a driver can deal with a race course in an optimum way by virtue of a simulation of the racetrack and by saving in advance operating modes and their characteristic diagrams for individual route sections which can be called automatically during the race.

As described above, the vehicle 10 can be operated either in a two-wheel drive mode or in a four-wheel drive mode. In the two-wheel drive mode, for example, the rear wheels are actuated here by means of the combustion engine 14, here the internal combustion engine, and in the four-wheel drive mode the front wheels 18 are additionally activated by means of assigned electric machine devices 16. The electric machine devices 16 are fed with energy from the energy storage device 22 here.

According to one embodiment, this energy storage device 22 is charged or fed by means of the electric machine devices 16, operated as generators, of the electric axle 20. The charging of the energy storage device 22 by means of at least one electric machine device 16 or both electric machine devices 16 can be carried out here, for example, exclusively by means of the latter, or the energy storage device 22 can be fed with energy by means of at least one further energy supply source. An additional energy supply source can be, for example, a fixed power network, for example a refueling station with an electric terminal, and/or a high-voltage generator device etc., to name just a few examples.

In a further embodiment, as an alternative to or in addition to the energy storage device 22 according to the first embodiment, a possibility for connection to a fixed power network (plug-in hybrid) is provided. That is to say the electric machine devices 16 and/or the energy storage device 22 are additionally fed with energy by means of, for example, a socket of a fixed electric terminal. For this purpose, the socket is connected or coupled, for example, to the energy storage device 22, the power inverter devices 24 and/or the electric machine devices 16.

In another embodiment, a generator device, for example a high-voltage generator device, is provided as an alternative to or in addition to the energy storage device 22 of the first embodiment and/or the fixed power network of the second embodiment. The high-voltage generator device is connected to the combustion engine 14, here the internal combustion engine. In the example shown in FIG. 1, the high-voltage generator device is connected to the combustion engine 14, for example at the rear axle. This high-voltage generator device here recovers energy here, for example from braking processes of the wheels of the rear axle etc, which are driven by means of the combustion engine 14. By means of this high-voltage generator device, the energy storage device can supply energy directly to the electric machine devices 16 and/or directly to the power inverter devices 24.

This vehicle with the electric axle drive device 12 can then be operated as an electric all-wheel drive vehicle or a four-wheel drive vehicle on a previously known route, in particular on a previously known racetrack or on a route determined by means of a navigation system. The four-wheel drive mode, instead of the alternative two-wheel drive mode in the vehicle 10, can then be provided, as previously described, if as a result of an advanced calculation, for example by means of a simulation calculation, a gain in time is determined by means of a four-wheel drive mode of the vehicle 10, for example in the bends of the previously determined route, compared to a two-wheel drive mode in the bends of the previously determined route. The four-wheel drive mode is then implemented by means of a motor operating mode of the electric axle 20 or of the electric axle drive device 12 in the bends of the route, as a result of which the route can be traveled along in a shorter time. By means of a simulation calculation, the travel through the previously known racetrack or else the route determined by the navigation system can be simulated here, for example once for the two-wheel drive mode and once for the four-wheel drive mode of the vehicle (driver enters the starting point and destination point of the route into the navigation device and the navigation device determines the suitable route for this). Through a comparison it is then possible to determine whether the four-wheel drive mode of the vehicle 10 permits, for example, more rapid travel through the route. In this case, it is then subsequently possible there for the vehicle 10 to be operated in the four-wheel drive mode, for example automatically or by an input by the driver by means of a corresponding input device 32, or the four-wheel drive mode can be controlled automatically by means of the control device 26. For this purpose, it is possible, for example when traveling through the previously known racetrack, for a characteristic diagram, or characteristic diagrams, assigned to a route section, to be called by the control device 26 and passed on to the engine control device 28, as described above. Likewise, the driver can also optionally additionally or alternatively request an operating mode and an assigned characteristic diagram or characteristic diagrams manually by means of a corresponding input device. The control device 26 can then correspondingly actuate the second electric drive device 12, for example in a selected acceleration mode or up-hill mode as the operating mode, and transmit, for example, a lambda value assigned to the operating mode or a characteristic diagram of the operating mode to the engine control device 28, with the result that said engine control device 28 makes available a suitable fuel mixture for the combustion engine 1 for the purpose of driving the rear axle.

For a motor operating mode of the electric axle 20 or electric axle drive device 12, it is, for example, additionally checked in advance whether the energy storage device 22 can make available sufficient energy to drive the two wheels 18 by means of the electric machine devices 16. For this purpose, for example, the charge state of the energy storage device 22 is checked to determine whether it is in a predetermined setpoint range. If this is the case, it is possible, for example, for a four-wheel drive mode of the vehicle 10, in which the two axle wheels 18 are additionally driven by means of the electric machine devices 16, to be provided, for example, in all of the bends on the predetermined or previously known route, in such a way that the behavior of the vehicle 10 is the same in every bend, i.e. the cornering speed in every bend is increased. This results in a continuously uniform driving behavior of the vehicle for the driver in every bend. If the actual charge state is not in the setpoint range or if the energy storage device 22 does not have sufficient charge, the four-wheel drive mode is not switched on and the vehicle 10 drives in the two-wheel drive mode. If, in addition to the energy storage device 22, further energy sources are available for driving the electric machine devices 16, it is optionally possible that the charge state thereof is additionally checked, and if said charge state is sufficient, the four-wheel drive mode is switched on, and otherwise it is necessary to wait until the energy storage device 22 or another additional energy source is sufficiently charged again. For this purpose, it is possible, for example, for a signal or signals to be generated by the engine control device 28 and/or the control device 26 for the purpose of charging the energy storage device 22 or another energy source, by means of which the electric machine devices 16 can be supplied with energy.

Figure 2:
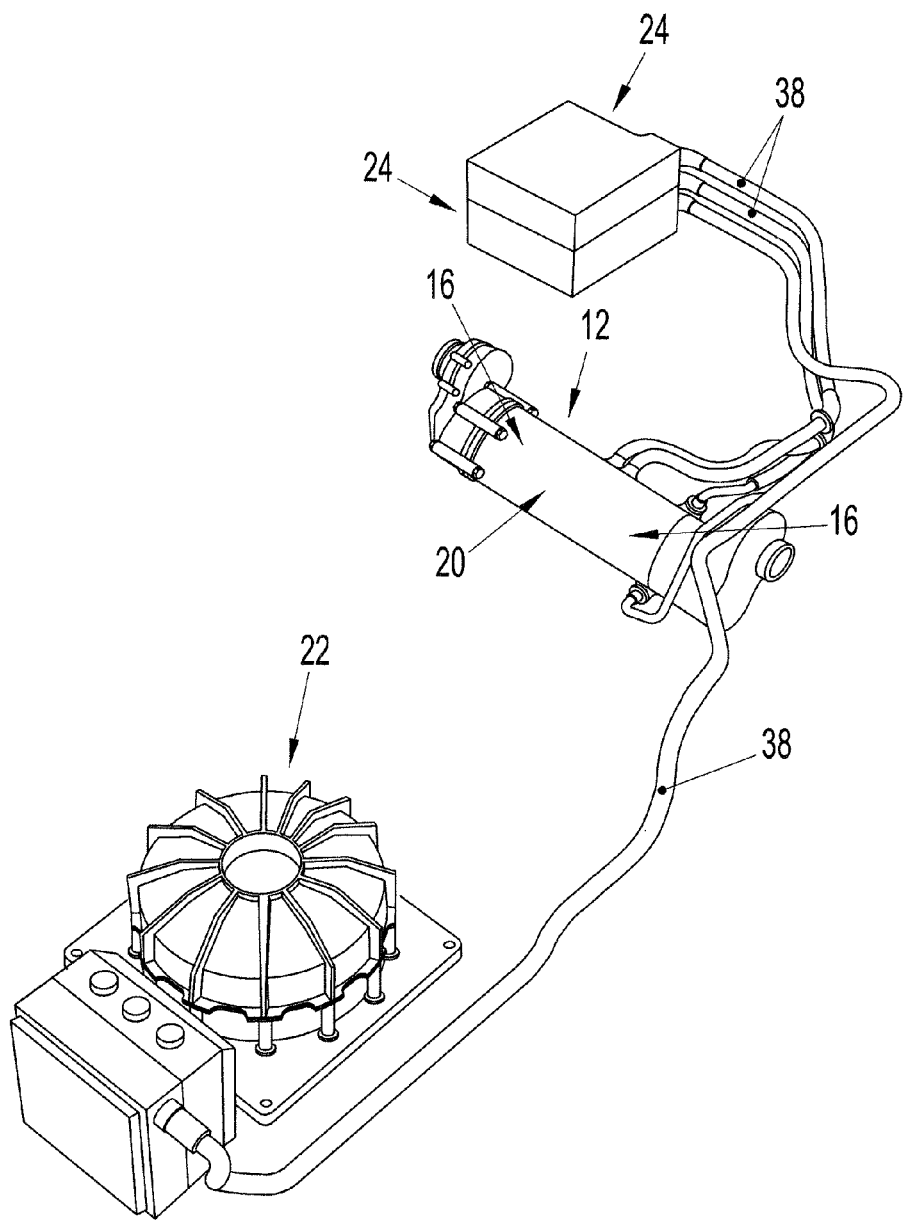
FIG. 2 is a perspective view of an example of the embodiment of the second electric axle drive device of the invention.

FIG. 2 is a perspective view of an example of the electric axle drive device 12 of the coupled axle drive system. As previously described, the electric axle drive device 12 has at least one electric machine, for example an electric motor, for driving a wheel of a vehicle axle 20. In the example in FIG. 2, two electric machines 16 are provided, one on each side of the axle 20, for example of the rear axle or of the front axle 20, which electric machines 16 can each drive an assigned wheel of the axle. The respective electric machine 16 is connected to an assigned power inverter device 24. Furthermore, a further power inverter 24 is connected by a line 38 to an energy storage device 22, for example a flywheel storage device 22, as shown in FIG. 2.

A control device or hybrid control device is provided for controlling the two electric machine devices 16. The control device or hybrid control device is connected to both power inverters 24 by in each case, one line (see FIG. 1), and to the energy storage device 22 by a line, and the control device is connected to the engine control device, for example by means of a bus system, for example a CAN bus system.

Figure 3:
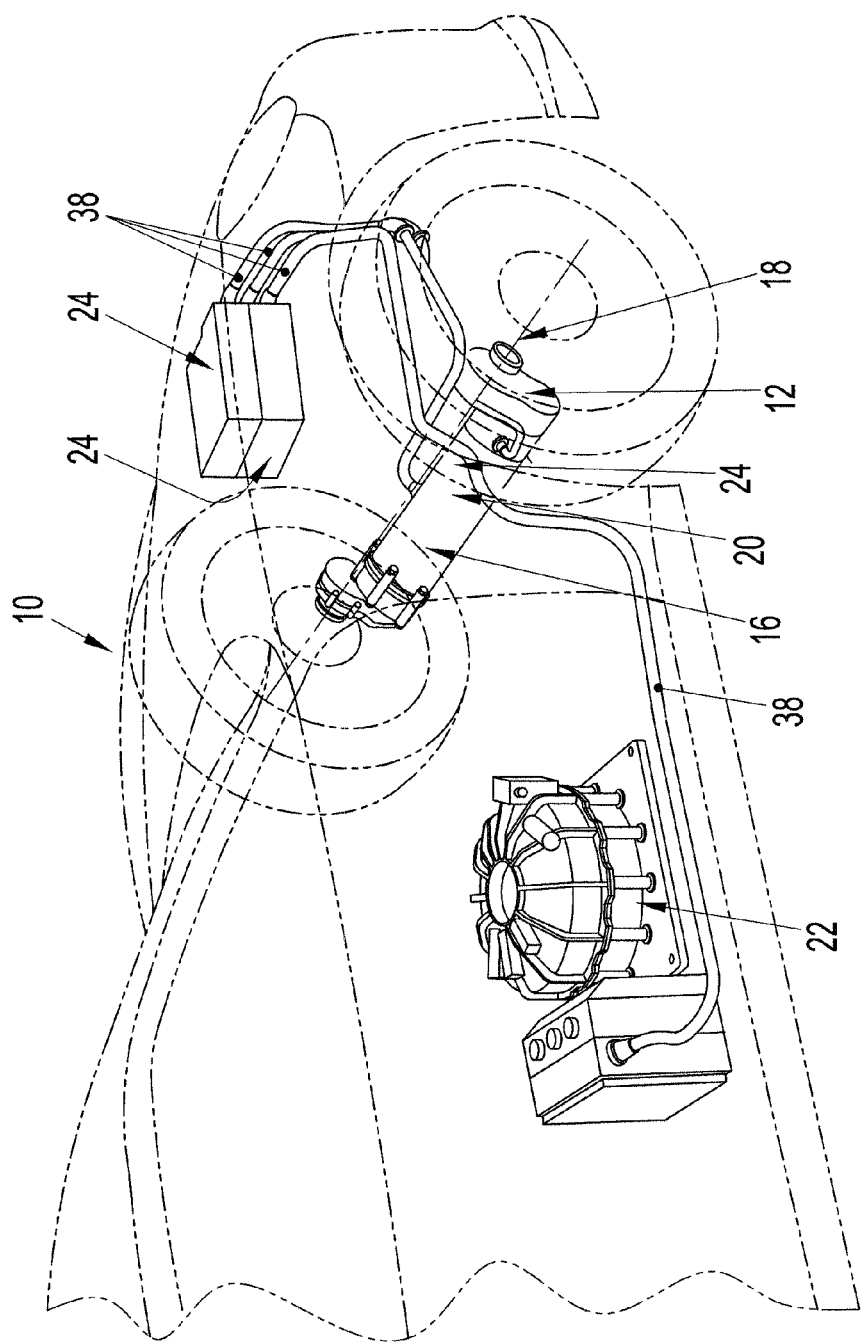
FIG. 3 is a perspective view of a vehicle illustrated in a transparent fashion with an installed second electric axle drive device according to FIG. 2.

Furthermore, FIG. 3 shows an example of an arrangement of the electric axle drive device 12 of FIG. 2 in a vehicle. As is shown in the example in FIG. 3, the electric axle drive device 12 is provided for driving one wheel or both wheels of the front axle 20, and is therefore connected to the front wheels 18. A front wheel is indicated by a dashed line in FIG. 3. In more precise terms, the electric machines 16 are arranged on the front axle 20 and the front wheels 18 thereof. Furthermore, the two power inverters 24 also are arranged at the front of the vehicle 10 in the vicinity of or at the electric machines 16 or the axle 20. However, the power inverters 24 also can be arranged at any other location in the vehicle 10, provided that they are connected or coupled to the electric machines 16 to make the necessary energy available to them. For example, a flywheel storage device 22 can be provided as an energy storage device 22. In the example shown in FIG. 3, the energy storage device 22 is provided in the center of the vehicle 10 or under the passenger space of the vehicle 10. The energy storage device 22 also can be arranged at any other location in the vehicle 10, for example at the front in the region of the front axle 20 or in the region of the rear or the rear axle of the vehicle 10. In this context, the energy storage device 22 is connected to the assigned power inverter 24 by a line 38, and the electric machines 26 are connected to the power inverters 24 by two lines 38.

Figure 4:
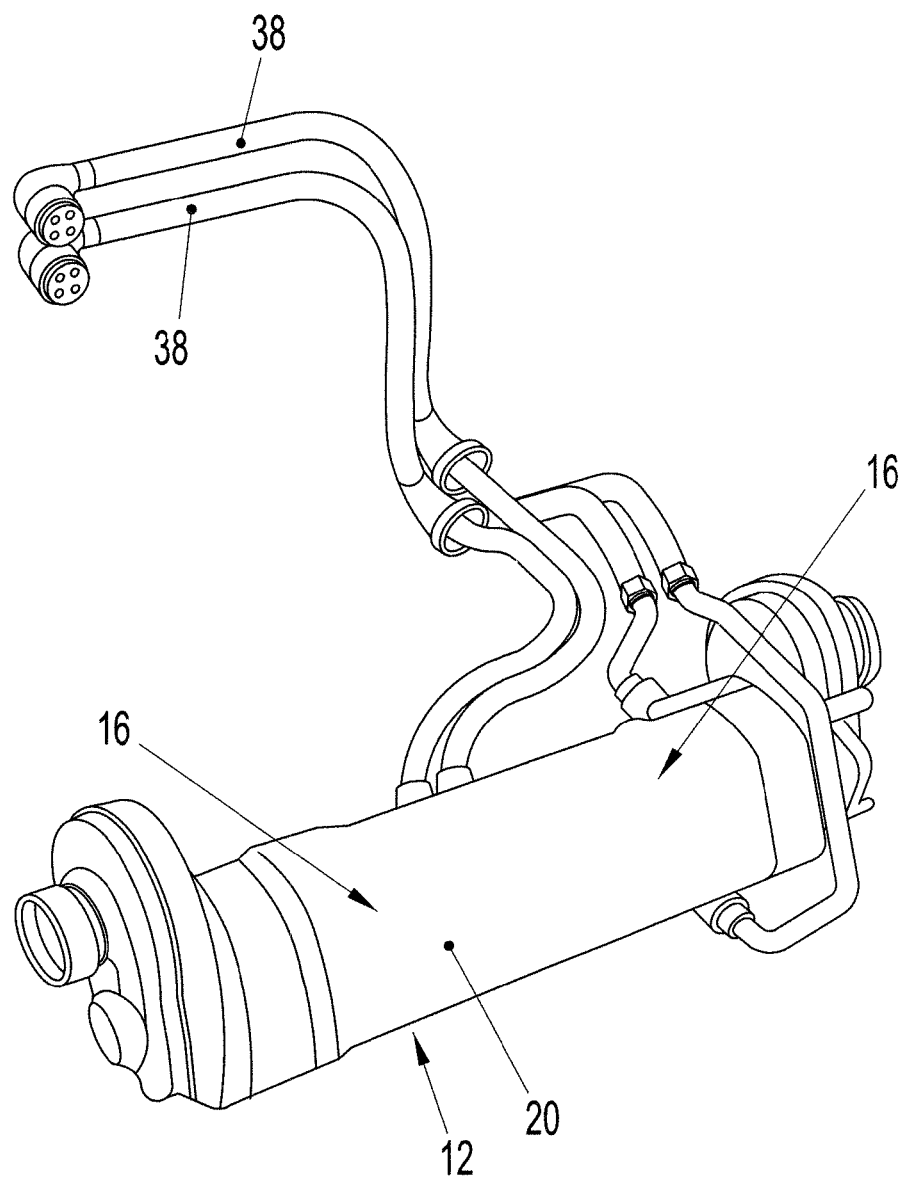
FIG. 4 is a detail of a perspective view of the second electric axle drive device according to FIGS. 2 and 3.

FIG. 4 shows a detail of the electric axle drive device 12 of the coupled axle drive system. As described above, the electric axle drive device 12 has the axle 20 with the two electric machines 16 for driving the two wheels of the axle 20, as well as the associated power inverters 24. In this context, in the first instance two lines 38 for connecting the electric machines 16 to the two power inverters 24 are shown. The two power inverters 24 are arranged in a housing, as is shown in the following FIG. 6.

Figure 5:
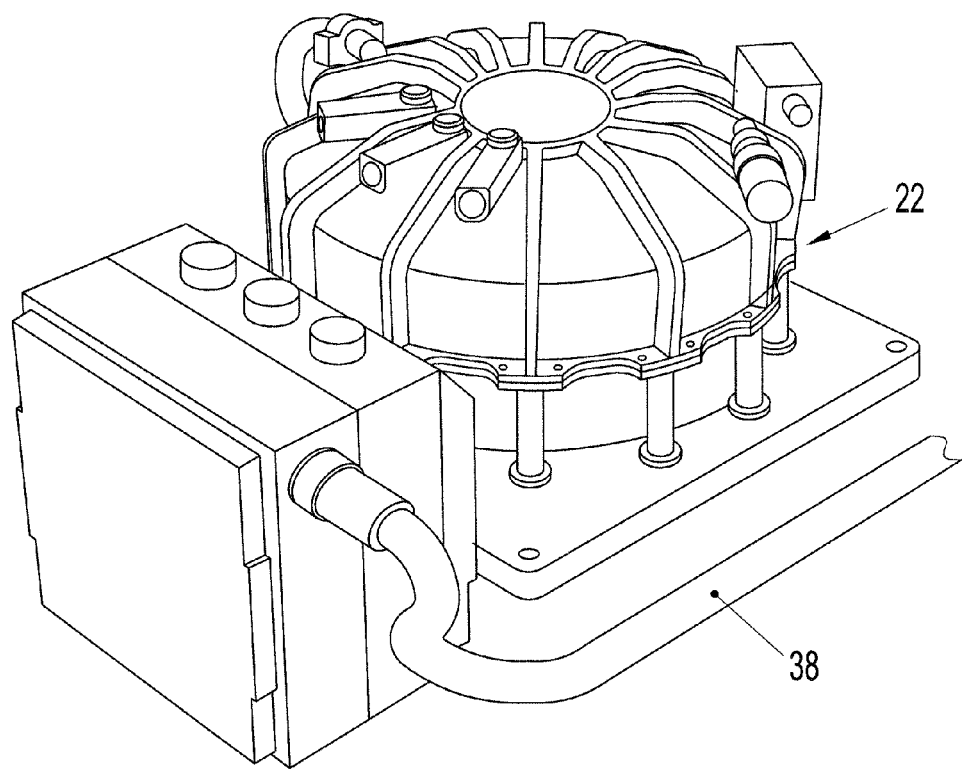
FIG. 5 is a detail of the energy storage device of the second electric axle drive device according to FIGS. 2 and 3.

Furthermore, FIG. 5 shows the energy storage device 22. The energy storage device 22 is embodied here, for example, as a flywheel storage device 22 that is connected to the two electric machines or to a power inverter by a line 38 to supply the electric machines with energy. Furthermore, the flywheel storage device 22 is connected to the control device or the hybrid control device (not illustrated) by means of a line device.

Figure 6:
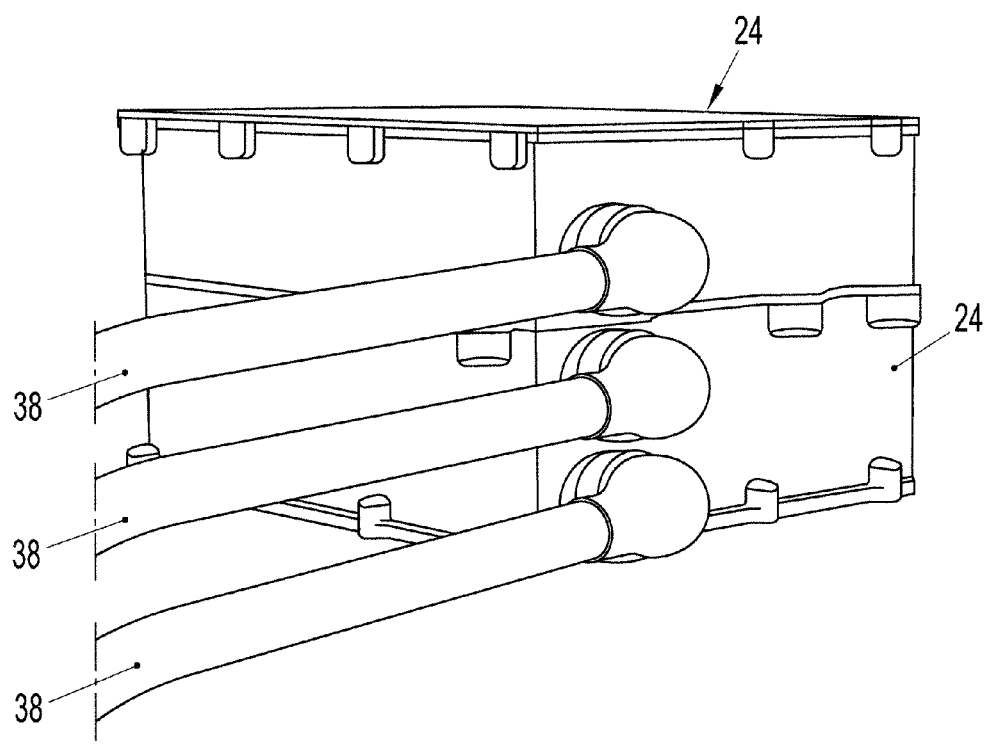
FIG. 6 is a detail of the control device for the axle drive device according to the invention according to FIGS. 2 and 3.

FIG. 6 shows the power inverters 24 that are connected to the two electric machines by means of line devices 38, and wherein a power inverter is connected to the energy storage device by means of a further line device 38.

Figure 7:
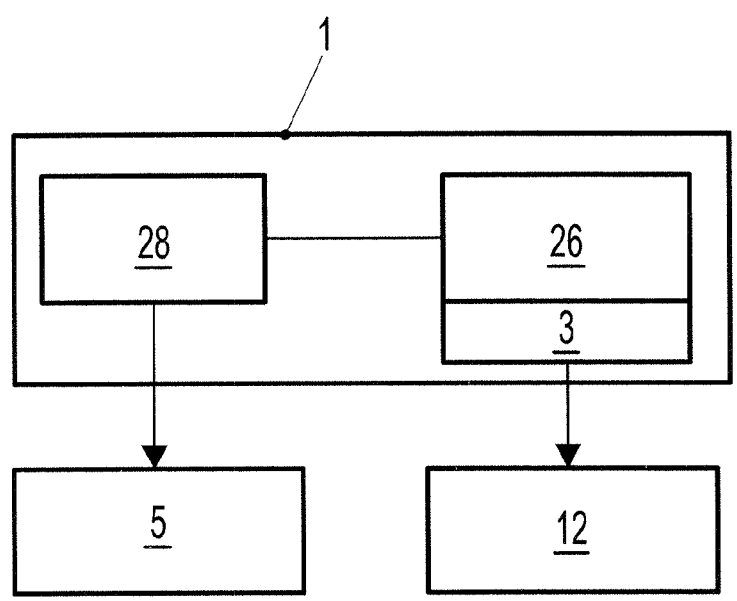
FIG. 7 is a schematic illustration of the control system of the invention.

Furthermore, FIG. 7 is a schematic illustration of the control system 1 of the invention. The control system 1 has the engine control device 28 that drives a first vehicle axle, for example the rear axle, by means of a combustion engine as the first axle drive device 12. Furthermore, the control system 1 has the control device 26 or hybrid control device that can drive a second vehicle axle, for example the front axle, electrically, for example by means of at least one electric machine. The control system 1 can implement a two-wheel drive mode and a four-wheel drive mode by means of the engine control device 28 and the control device 26 in the vehicle. In the case of a four-wheel drive mode the control device 26 actuates the second axle drive device 12, with the result that the latter additionally drives the second vehicle axle. The control device 26 has a storage device 3 which, in the embodiment of FIG. 7, is part of the control device 26. If the vehicle is then to be operated in a four-wheel drive mode instead of in a two-wheel drive mode, the control device 26 automatically calls at least one characteristic diagram for the engine control device 28 from the storage device 3 to actuate the first axle drive device in the four-wheel drive mode. The control device 26 then passes on the characteristic diagram for the engine control device thereto, with the result that the engine control device can actuate or activate the first axle drive device on the basis of the characteristic diagram.

As previously described, at least one route section, suitable for a four-wheel drive mode, of a route (for example racetrack or navigation route) and at least one assigned characteristic diagram for the engine control device 28 are stored in advance in the storage device 3 and called by the control device, for example before or when the route section is reached, and the characteristic diagram can be passed on automatically to the engine control device 28. The engine control device 28 here is connected to the control device 26 by means of, for example, a bus system, for example a CAN bus.

The invention has been described with reference to the preferred embodiments, but is not restricted thereto and can be modified in a variety of ways.

In particular, the various embodiments, particularly individual features thereof, can also be combined with one another.

In this context, the electric axle drive device can be provided for a rear axle or a front axle of a vehicle. One wheel or both wheels of the axle can, when necessary, be driven by the electric drive device. Furthermore, a separate electric machine, for example an electric motor, and a power inverter can be provided for each of the wheels so that both wheels can be driven independently of one another. However, just one electric motor can be provided for driving both wheels of an axle and for a corresponding assigned power inverter to be provided. Furthermore, the two electric machines for driving the two wheels of the axle can have separate energy storage devices, for example a battery and/or a flywheel storage device etc., instead of a common energy storage device.

The vehicle axle can be embodied as part of the electric drive device, as shown, for example, in FIGS. 2, 3 and 4, and can be installed as such in a vehicle. The axle need not be part of the electric drive device, and instead, for example, the respective electric machine, the power inverter and the energy storage device can be retrofitted in a vehicle and the axle thereof.

What is claimed is:

1. A method for operating a control system of a vehicle, the control system having an engine control device for controlling a first axle drive device by means of a connected combustion engine to drive a first axle of the vehicle, and an electric axle control device for controlling a second electric axle drive device to drive a second axle of the vehicle, the method comprising:
   simulating travel of the vehicle on the route in a two-wheel drive mode in which only the first axle is driven, and then in a four-wheel drive mode in which both axles are driven for determining a route section suitable for a four-wheel drive mode in which the vehicle axles are driven by the first and second axle drive devices;
   comparing the simulations for the two-wheel drive mode and the four-wheel drive mode;
   determining a route section in which the vehicle passes more quickly in the simulation in the four-wheel drive mode than in the two-wheel drive mode; and
   storing the route section for the four-wheel drive mode and at least one characteristic diagram for driving the first axle drive device in the four-wheel drive mode;
   calling the characteristic diagram by the electric axle control device when the second axle drive device is actuated by the electric axle control device to drive the second axle; and
   passing the characteristic diagram to the engine control device for the controlling the first axle drive device on the basis of the characteristic diagram to drive the first axle.

2. The method of claim 1, further comprising:
   traveling along either a previously travelled route or a route specified by a GPS system with the vehicle while the engine control device controls the first axle drive device for driving the first vehicle axle;
   determining on the basis of either the previous travel on the route or GPS data for the route whether a route section is present that is suitable for an additional drive of the second axle drive device;
   actuating the second axle drive device by the control device if such a route section is present for driving the second vehicle axle;
   having the control device call the at least one characteristic diagram assigned to the route section; and passing the characteristic diagram to the engine control device for controlling the first axle drive device on the basis of the at least one characteristic diagram in the four-wheel drive mode.

3. The method of claim 1, wherein the characteristic diagram depends on a lambda value.

4. The method of claim 1, wherein a load point of the internal combustion engine is raised based on the characteristic diagram in a four-wheel drive mode in which the first and second axle drive devices drive the first and second axles.

5. The method of claim 1, wherein the control device controls the second axle drive device in the four-wheel drive mode so that the second axle drive device operates the second vehicle axle in a generator mode.

* * * * *